(12) United States Patent
Tuohimaa et al.

(10) Patent No.: US 9,296,464 B1
(45) Date of Patent: Mar. 29, 2016

(54) AIRCRAFT AND ASSOCIATED DOOR MEMBER BIASING ASSEMBLY AND METHOD

(71) Applicant: The Boeing Company, Chicago, IL (US)

(72) Inventors: Clyde R. Tuohimaa, Lynnwood, WA (US); James Hacault, Winnipeg (CA)

(73) Assignee: The Boeing Company, Chicago, IL (US)

( * ) Notice: Subject to any disclaimer, the term of this patent is extended or adjusted under 35 U.S.C. 154(b) by 38 days.

(21) Appl. No.: 14/539,258

(22) Filed: Nov. 12, 2014

(51) Int. Cl.
*B64C 1/14* (2006.01)
*B64C 9/16* (2006.01)
*B64C 7/00* (2006.01)

(52) U.S. Cl.
CPC ................. *B64C 1/1407* (2013.01); *B64C 7/00* (2013.01); *B64C 9/16* (2013.01)

(58) Field of Classification Search
None
See application file for complete search history.

(56) References Cited

U.S. PATENT DOCUMENTS

| 4,576,347 | A | 3/1986 | Opsahl |
| 7,744,034 | B2 | 6/2010 | Coughlin |
| 2002/0000493 | A1* | 1/2002 | Erben ................... B64C 1/1407 244/129.5 |
| 2009/0026317 | A1* | 1/2009 | Coughlin ................. B64C 9/16 244/129.1 |

\* cited by examiner

*Primary Examiner* — Christopher P Ellis
*Assistant Examiner* — Richard G Davis
(74) *Attorney, Agent, or Firm* — Walters & Wasylyna LLC

(57) ABSTRACT

An aircraft having an opening therein, the aircraft including a door member moveable relative to the opening between at least an open position and a closed position, and a biasing assembly operatively connected to the door member to bias the door member to the closed position, the biasing assembly including a torsion spring.

17 Claims, 9 Drawing Sheets

AIRCRAFT AND ASSOCIATED DOOR MEMBER BIASING ASSEMBLY AND METHOD

FIELD

This application relates to aircraft wing flap actuation and, more particularly, to translating door members used to seal openings associated with aircraft wing flap actuation.

BACKGROUND

Fixed-wing aircraft typically include flaps mounted on the trailing edges of the wings. When extended, the flaps modify the effective contour of the wings and, thus, modify the lift characteristics of the wings. During takeoff, the flaps may be extended (at least partially) to shorten the length of runway required to achieve liftoff. During landing, the flaps may be extended (e.g., fully) to slow airspeed and decrease the length of runway required to achieve a complete stop.

The flaps on the wing of an aircraft, particularly the inboard flaps, are typically actuated by a flap carriage mechanism housed within the fuselage (or within the fuselage/wing fairing). A torque tube extends through the fuselage (or though the fuselage/wing fairing) to couple the internal flap carriage mechanism with the external flap. Therefore, an opening must be formed in the fuselage (or in the fuselage/wing fairing) to accommodate movement of the torque tube as it urges the corresponding flap from a retracted position to an extended position, and vice versa.

The torque tube openings on an aircraft, if left unsealed, have been known to affect aircraft aerodynamics. For example, pilots operating aircraft without means for sealing the torque tube openings have experienced vibrations during landing, which are now known to be caused by the unsealed torque tube openings. Therefore, various attempts have been made to seal torque tube openings in aircraft.

Despite advances already made, those skilled in the art continue with research and development efforts in the field of aircraft wing flap actuation.

SUMMARY

In one embodiment, disclosed is an aircraft having an opening therein. The aircraft may include a door member moveable relative to the opening between at least an open position and a closed position. The aircraft may further include a biasing assembly operatively connected to the door member to bias the door member to the closed position. The biasing assembly may include a torsion spring.

In another embodiment, the disclosed aircraft may include a fuselage, a wing connected to the fuselage, a fuselage/wing fairing positioned at an interface between the fuselage and the wing, the fuselage/wing fairing defining an opening therein, a door member positioned to translate relative to said opening between at least an open position and a closed position, and a biasing assembly that includes a primary link member hingedly connected proximate the opening and moveable about a first hinge axis, an extension link member having a proximal end and a distal end, the proximal end being hingedly connected to the primary link member about a second hinge axis, the distal end being hingedly connected to the door member about a third hinge axis, and a torsion spring operatively connected to the primary link member to urge the primary link member about the first hinge axis.

In another embodiment, disclosed is a door biasing assembly including a primary link member moveable about a first hinge axis, an extension link member having a proximal end and a distal end, the proximal end being hingedly connected to the primary link member about a second hinge axis, the distal end being hingedly connectable to a door member about a third hinge axis, and a torsion spring operatively connected to the primary link member to urge the primary link member about the first hinge axis.

In yet another embodiment, disclosed is a method for biasing a door member on an aircraft, wherein the door member is moveable between at least a closed position and an open position. The method may include the steps of (1) operatively connecting a torsion spring to the door member to urge the door member to the closed position; (2) applying a door opening force to the door member to move the door member to the open position, thereby loading the torsion spring; and (3) removing the door opening force, thereby allowing the torsion spring to urge the door member to the closed position.

Other embodiments of the disclosed aircraft and associated door member biasing assembly and method will become apparent from the following detailed description, the accompanying drawings and the appended claims.

DETAILED DESCRIPTION

Figure 1:
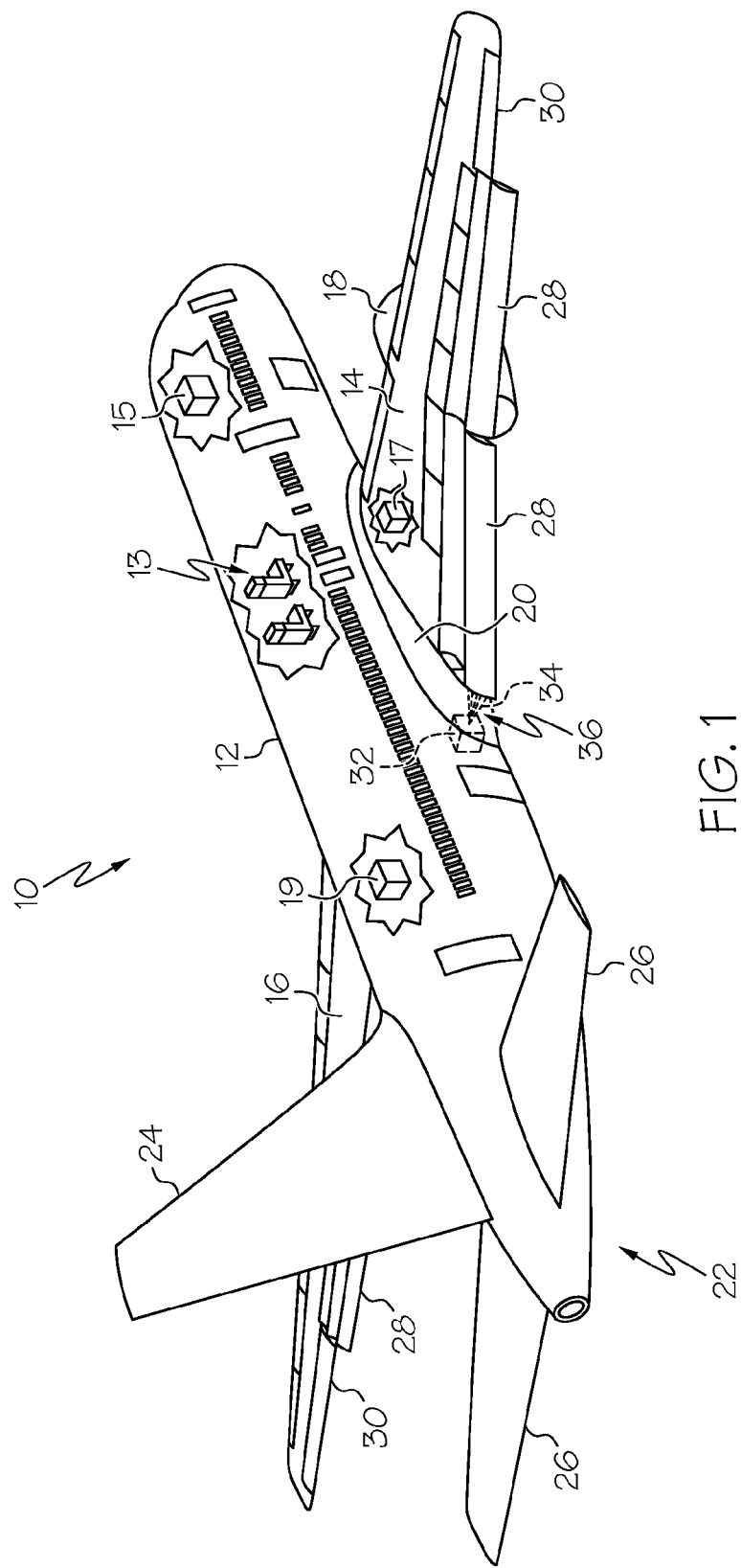
FIG. 1 is a side and rear perspective view of one embodiment of the disclosed aircraft.

Referring to FIG. 1, one embodiment of the disclosed aircraft, generally designated 10, may be a fixed-wing aircraft. The aircraft 10 may include a fuselage 12, a pair of wings 14, 16 and one or more propulsion units 18 (e.g., jet engines). In addition to propulsion units 18, the aircraft 10 may include various high-level systems, such as, but not limited to, an electrical system 15, a hydraulic system 17 and/or an environmental system 19. The aft portion 22 of the aircraft 10 may include a vertical stabilizer 24 and horizontal stabilizers 26, which may include various control surfaces.

The fuselage 12 may define an interior 13, which may include a passenger compartment and/or a cargo compartment. A fuselage/wing fairing 20 may be provided at each interface between the fuselage 12 and the wing 14, 16 and may extend from proximate (at or near) the fuselage 12 to proximate the associated wing 14, 16. The propulsion units 18 may be mounted to the wings 14, 16.

Flaps 28 may be mounted on the trailing edges 30 of the wings 14, 16. The flaps 28 may be moveable between at least a retracted position and an extended position, as is well known in the art. A flap carriage mechanism 32 (e.g., a motorized arm) may be associated with each wing 14, 16 for actuating the flaps 28. The flap carriage mechanism 32 may be housed within the fuselage 12 and/or the fuselage/wing fairing 20. A torque tube 34 may couple the flap carriage mechanism 32 with the associated flap 28 to transfer an actuating/deactuating (extending/retracting) force from the flap carriage mechanism 32 to the associated flap 28. Therefore, the torque tube 34 may extend through an opening 36 in the aircraft 10 (e.g., an opening 36 in the fuselage 12 and/or the fuselage/wing fairing 20). The opening 36 in the aircraft 10 may be sized and shaped to accommodate the travel path of the torque tube 34.

Figure 2:
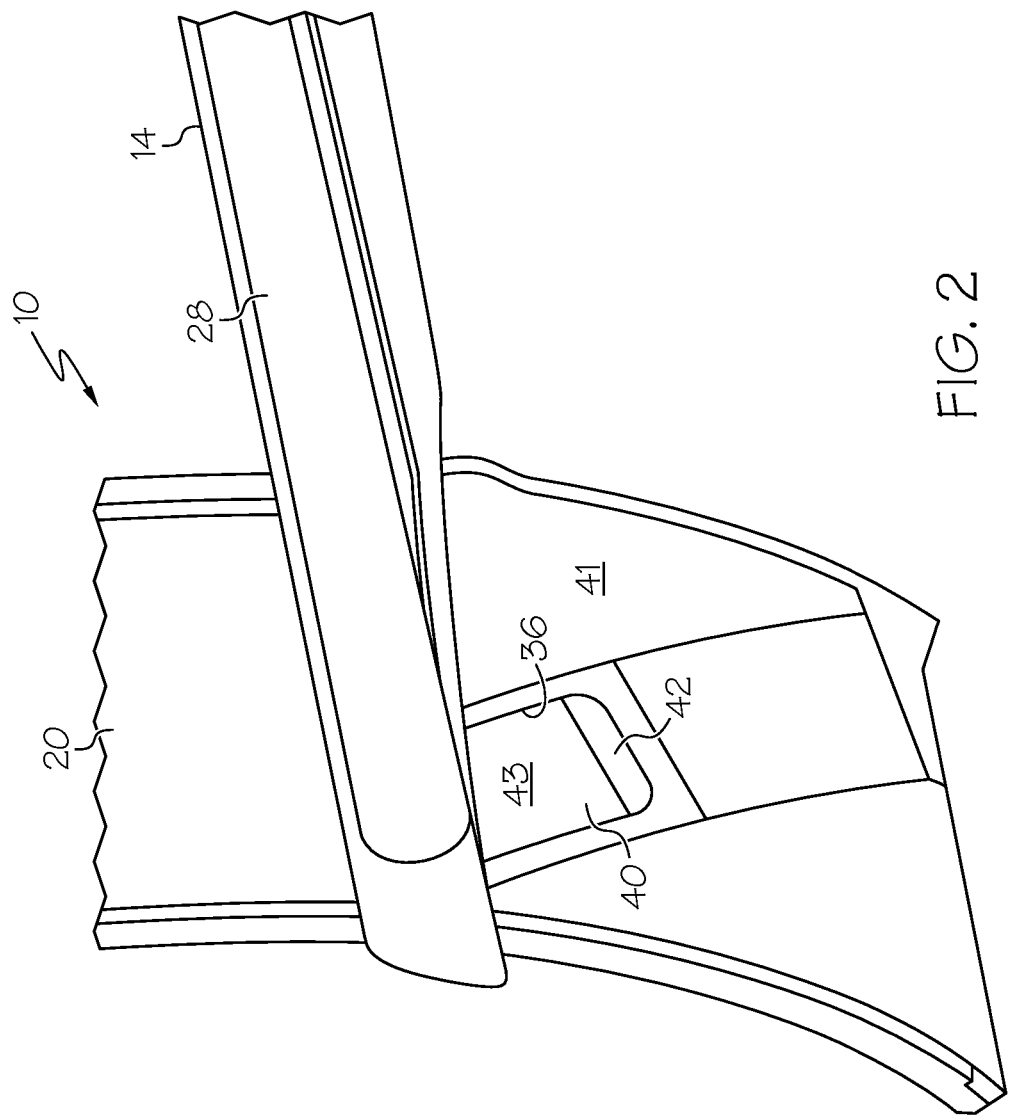
FIG. 2 is an exterior perspective view of a portion of the aircraft of FIG. 1, shown with the door member in the closed position.

Referring to FIG. 2, the opening 36 may be at least partially sealable with a door member 40. The door member 40 may move (e.g., translate) relative to the opening 36 between at least a closed position (FIGS. 2 and 3) and an open position (FIGS. 4 and 5). In the closed position (see FIG. 2), the door member 40 may be smoothly faired with the outer surface 41 of the aircraft 10 (e.g., with the outer surface 41 of the fuselage/wing fairing 20 of the aircraft 10).

Figure 6:
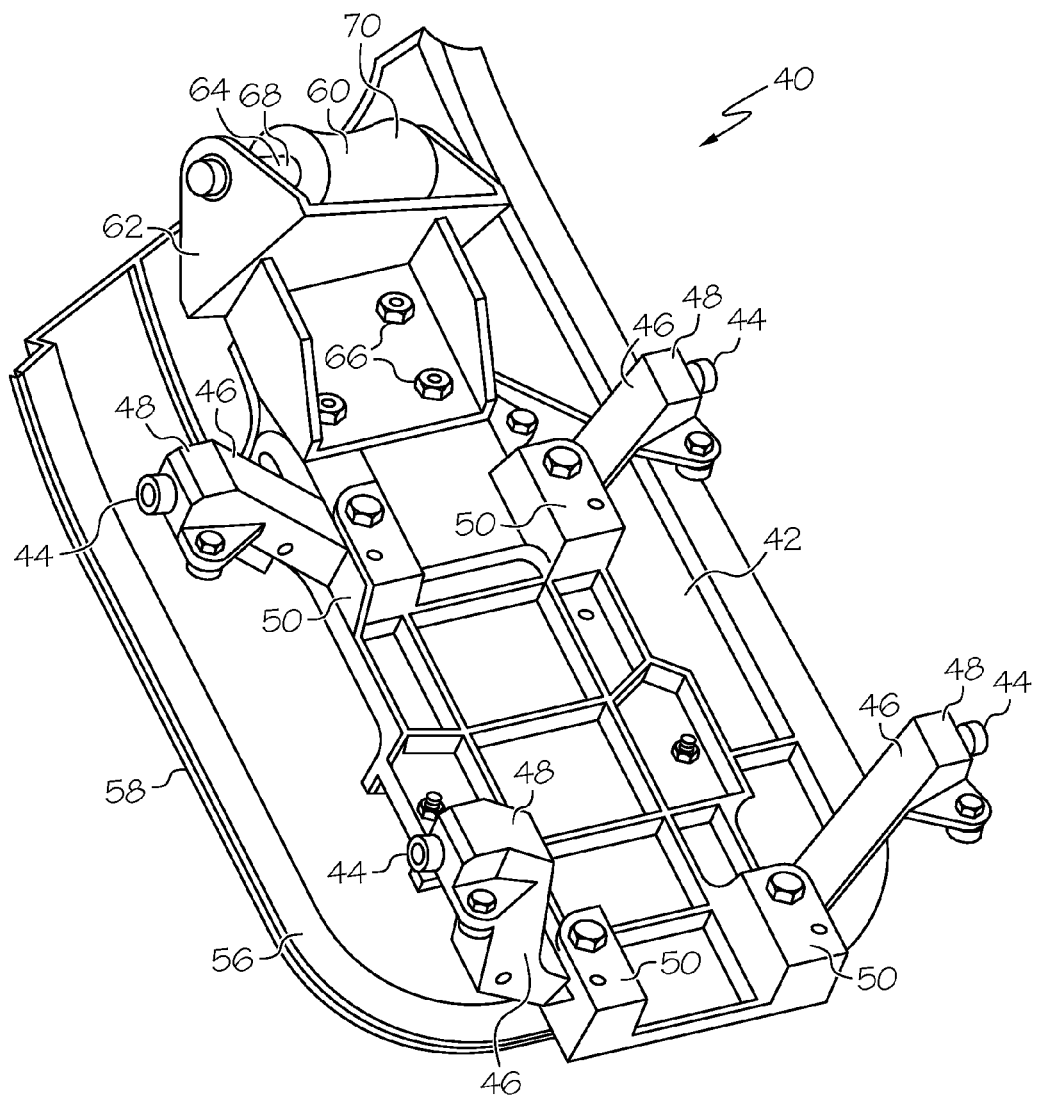
FIG. 6 is an interior perspective view of the door member of the aircraft of FIG. 1, shown separated and removed from the aircraft.

Referring to FIG. 6, the door member 40 may include a door panel 42, rollers 44 and frame members 46. Each frame member 46 may include a first end 48 and a second end 50. The rollers 44 may be rotatably connected to the first ends 48 of the frame members 46. The second end 50 of each frame member 46 may be securely connected to the door panel 42, such as with mechanical fasteners (e.g., bolts).

Figure 3:
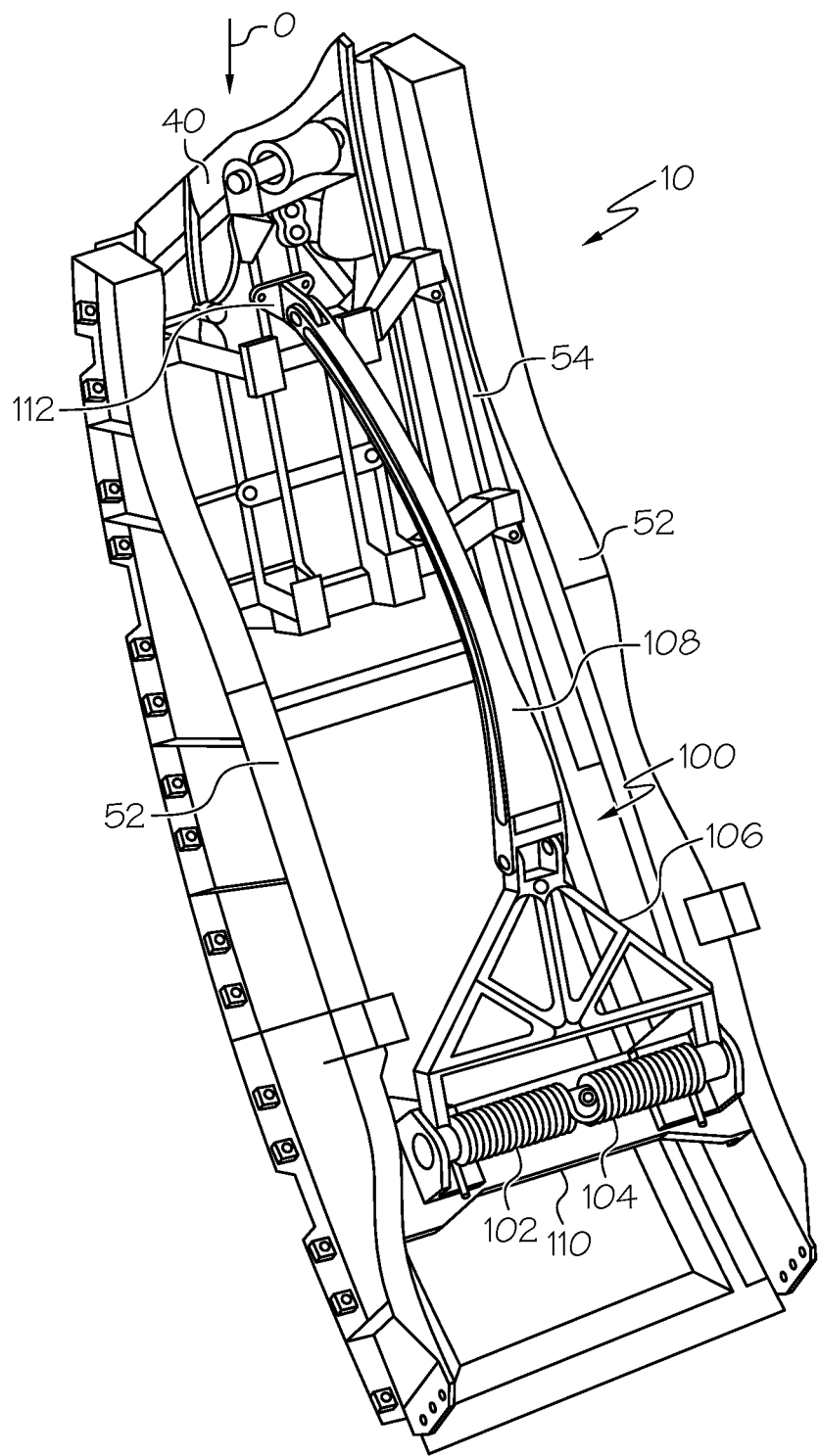
FIG. 3 is an interior perspective view of the portion of the aircraft shown in FIG. 2, shown with the door member in the closed position.
Figure 4:
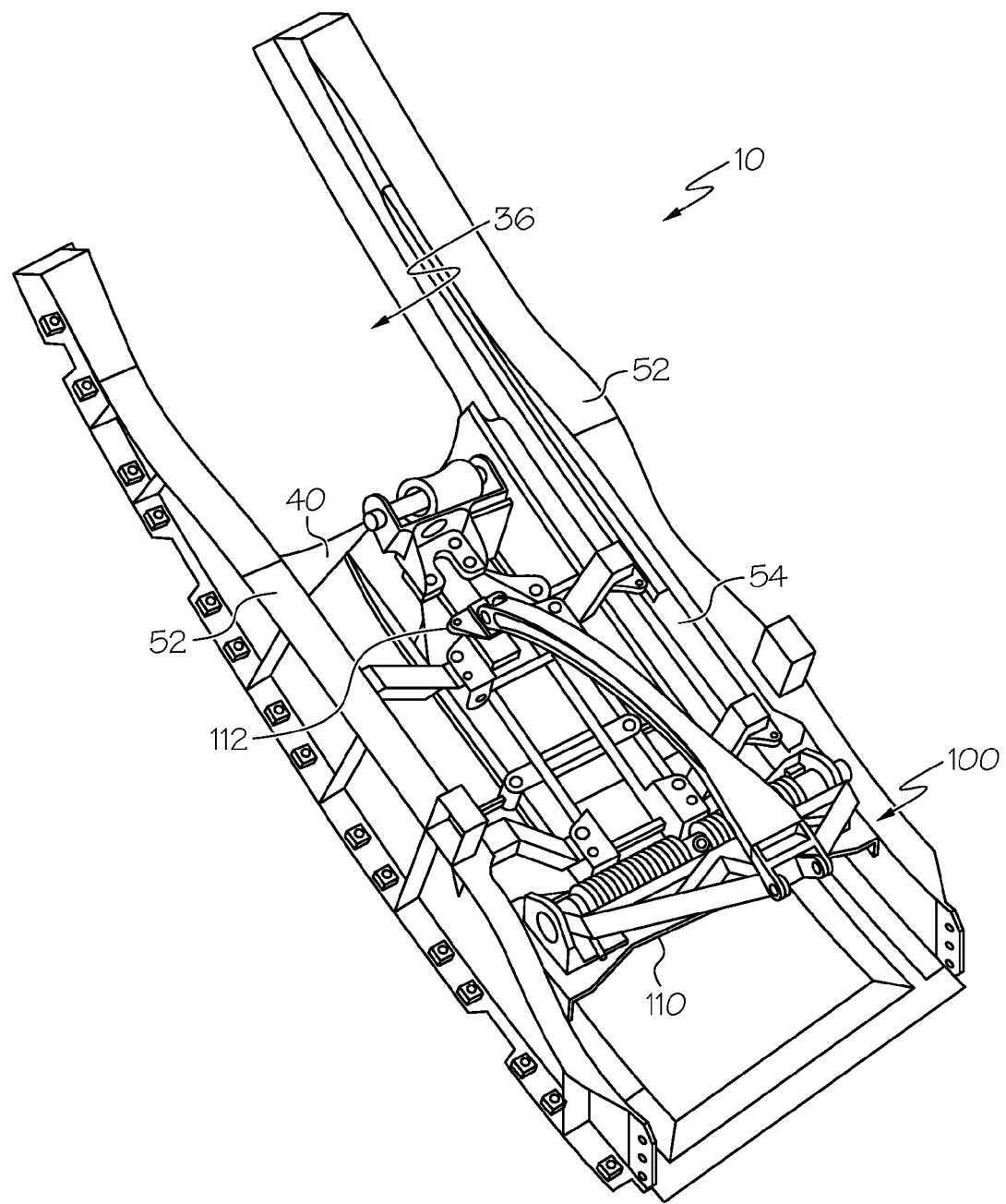
FIG. 4 is an interior perspective view of the portion of the aircraft shown in FIG. 3, but shown with the door member in the open position.
Figure 5:
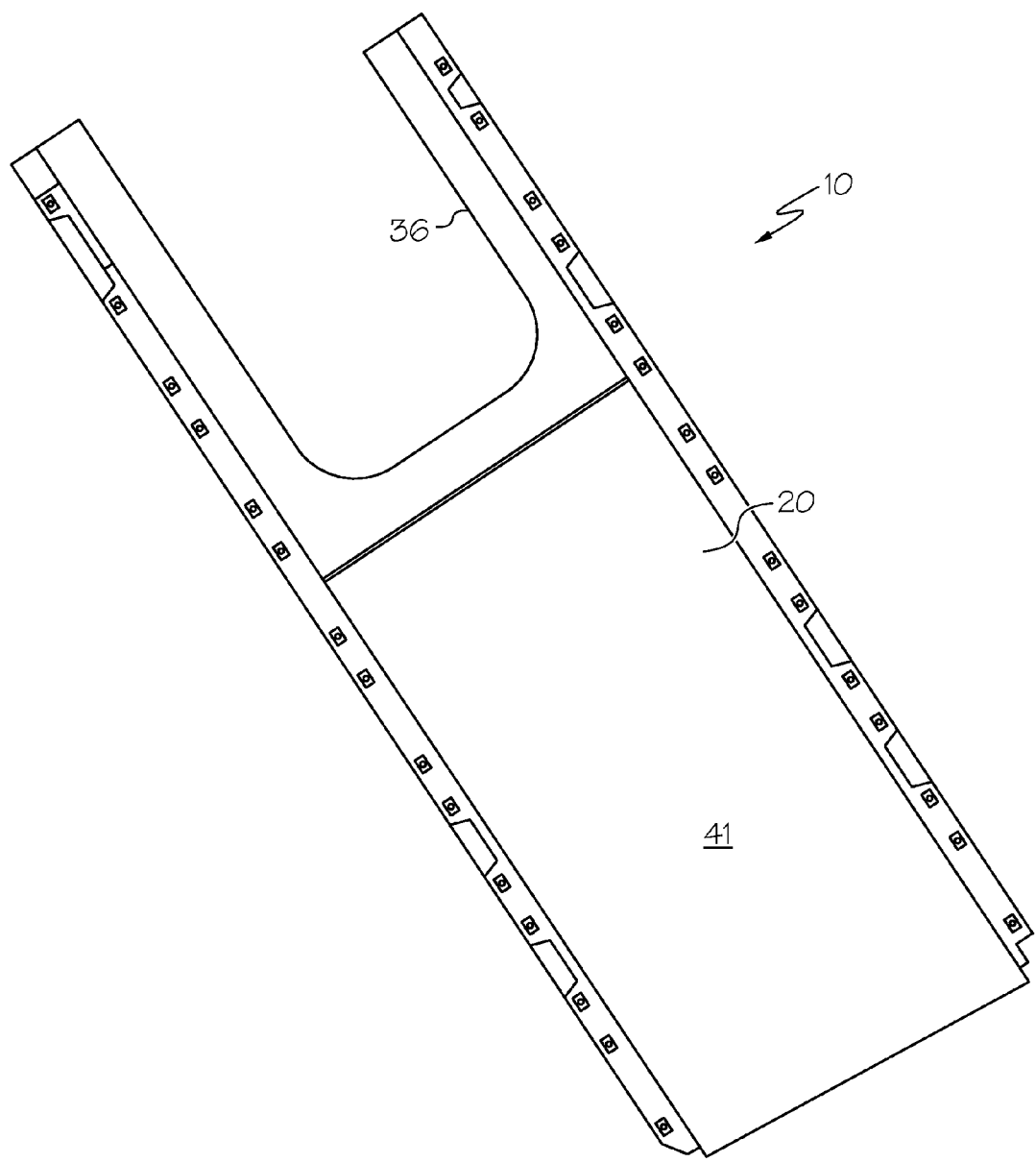
FIG. 5 is an exterior perspective view of the portion of the aircraft shown in FIG. 4, shown with the door member in the open position.

Referring to FIGS. 3 and 4, the aircraft 10 may include a pair of track members 52 positioned proximate the opening 36 (FIG. 4). The pair of track members 52 may be laterally opposed from each other, and may extend along the translation path of the door member 40. The opening 36 may be positioned between the track members 52. The track members 52 may define elongated slots 54 therein.

The door member 40 may be connected to the aircraft 10 by engaging the slots 54 in the track members 52 with the rollers 44 of the door member 40. The roller-in-slot engagement between the door member 40 and the aircraft 10 may facilitate translation of the door member 40 relative to the opening 36 between at least the closed position (FIGS. 2 and 3) and the open position (FIGS. 4 and 5).

Those skilled in the art will appreciate that the slots 54 in the track members 52 may define the translation path of the door member 40. Therefore, the slots 54 in the track members 52 may be configured to ensure that the outer surface 43 (FIG. 2) of the door panel 42 of the door member 40 is smoothly faired with the outer surface 41 (FIG. 2) of the aircraft 10 (e.g., the outer surface 41 of the fuselage/wing fairing 20) when the door member 40 is in the closed position (FIGS. 2 and 3).

The door member 40 may include an outer periphery 56 having a seal 58 connected thereto. The seal 58 may be positioned to form a seal (e.g., a substantially airtight seal) between the opening 36 (FIG. 2) in the aircraft 10 (FIG. 2) and the door member 40 when the door member 40 is in the closed position (FIGS. 2 and 3).

Referring back to FIG. 6, the door member 40 may include a torque tube roller member 60. The torque tube roller member 60 may be connected to the door panel 42 of the door member 40 with a bracket 62 and a pin 64. The bracket 62 may be secured to the door panel 42 using mechanical fasteners 66, such as bolts 48, or by other means (e.g., welding). The pin 64 may be threaded and may extend through opening 68 in the torque tube roller member 60 across the bracket 62. The opening 68 may be adapted to receive the threads in the torque tube roller member 60. In such manner, the torque tube roller member 60 may be adapted to rotatably move along the pin 64. Other techniques for attaching the torque tube roller member 60 to the door member 40 are also contemplated. The outer surface 70 of the torque tube roller member 60 may be contoured to interact with the shape of the torque tube 34 of the aircraft 10. For example, the outer surface 70 of the torque tube roller member 60 may be curved (e.g., concave).

Thus, with reference to FIGS. 1-5, when the flaps 28 of the aircraft 10 are in the retracted position, the torque tube 34 may be spaced apart from and not in contact with the door member 40 (e.g., with the torque tube roller member 60 of the door member 40). This may allow the torque tube 34 and its associated flap 28 to undergo small movements during normal cruise, while in the retracted position, without the torque tube 34 contacting and moving the door member 40. As a result, the door member 40 may remain in the closed position (FIGS. 2 and 3), thereby lessening drag on the aircraft 10 and avoiding unnecessary wear.

When the flaps 28 of the aircraft 10 are actuated to the extended position, the torque tube 34 may abut the contoured outer surface 70 of the torque tube roller member 60, thereby urging the associated door member 40 relative to the opening 36 along the track members 52. Ultimately, the torque tube 34 may move the door member to the fully open position shown in FIGS. 4 and 5.

When the flaps 28 of the aircraft 10 are returned to the retracted position from the extended position, the torque tube 34 may be withdrawn from the opening 36 (FIG. 4). Therefore, as the torque tube 34 is withdrawn from the opening 36, the disclosed door member biasing assembly (e.g., biasing assembly 100 shown in FIGS. 7 and 8) may urge the door member 40 from the open position (shown in FIG. 4) to the closed position (shown in FIG. 3).

The disclosed door member biasing assembly (e.g., biasing assembly 100 shown in FIGS. 7 and 8) may be operatively connected to the door member 40 and may bias the door member 40 to the closed position using at least one torsion spring. Torsion springs have proven durability and may offer extended part life, particularly comparted to gas springs. Incorporating multiple torsion springs into the disclosed door member biasing assembly may provide redundancy at relatively low cost.

Figure 7:
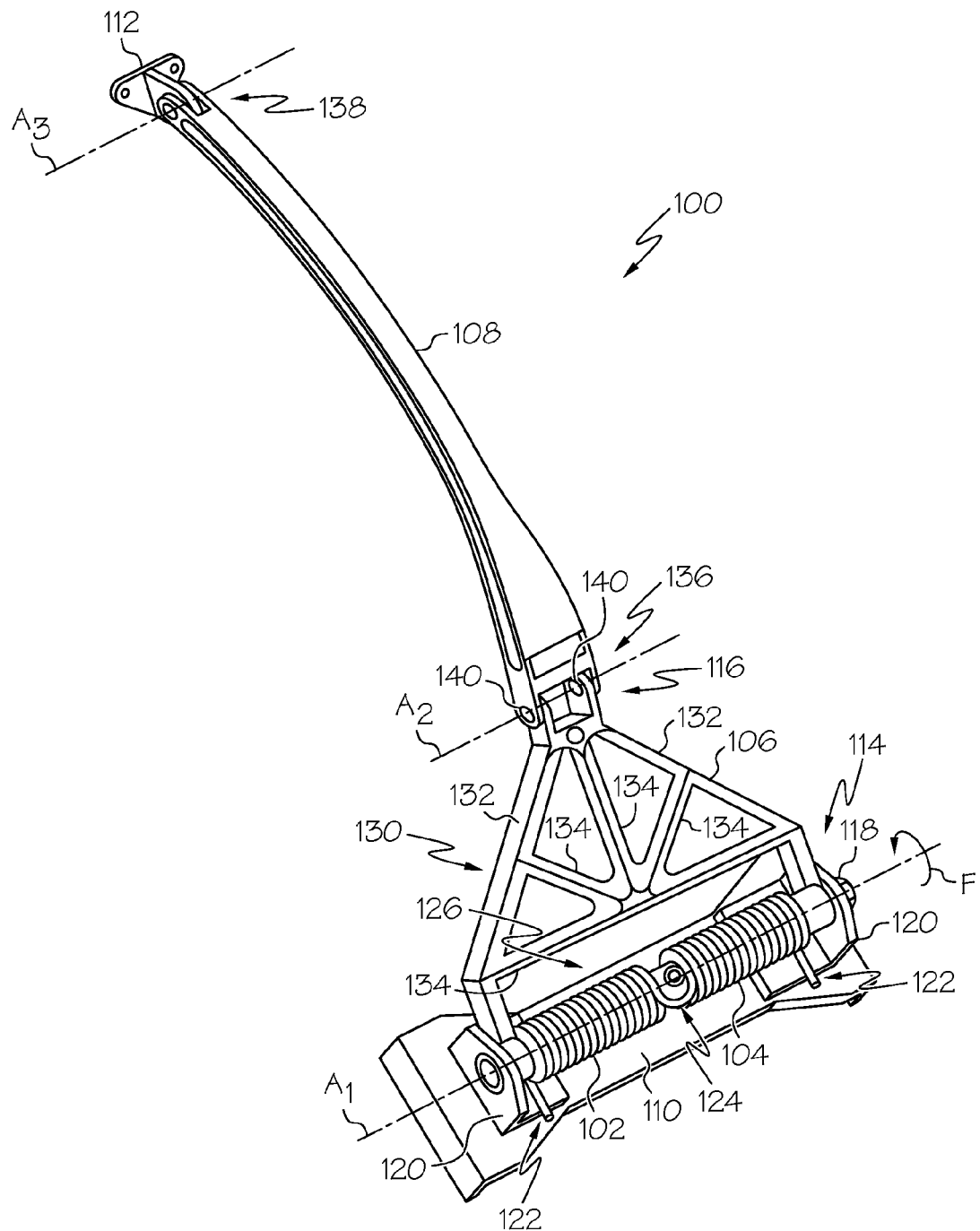
FIG. 7 is a perspective view of one embodiment of the door member biasing assembly of the aircraft shown in FIG. 1.
Figure 8:
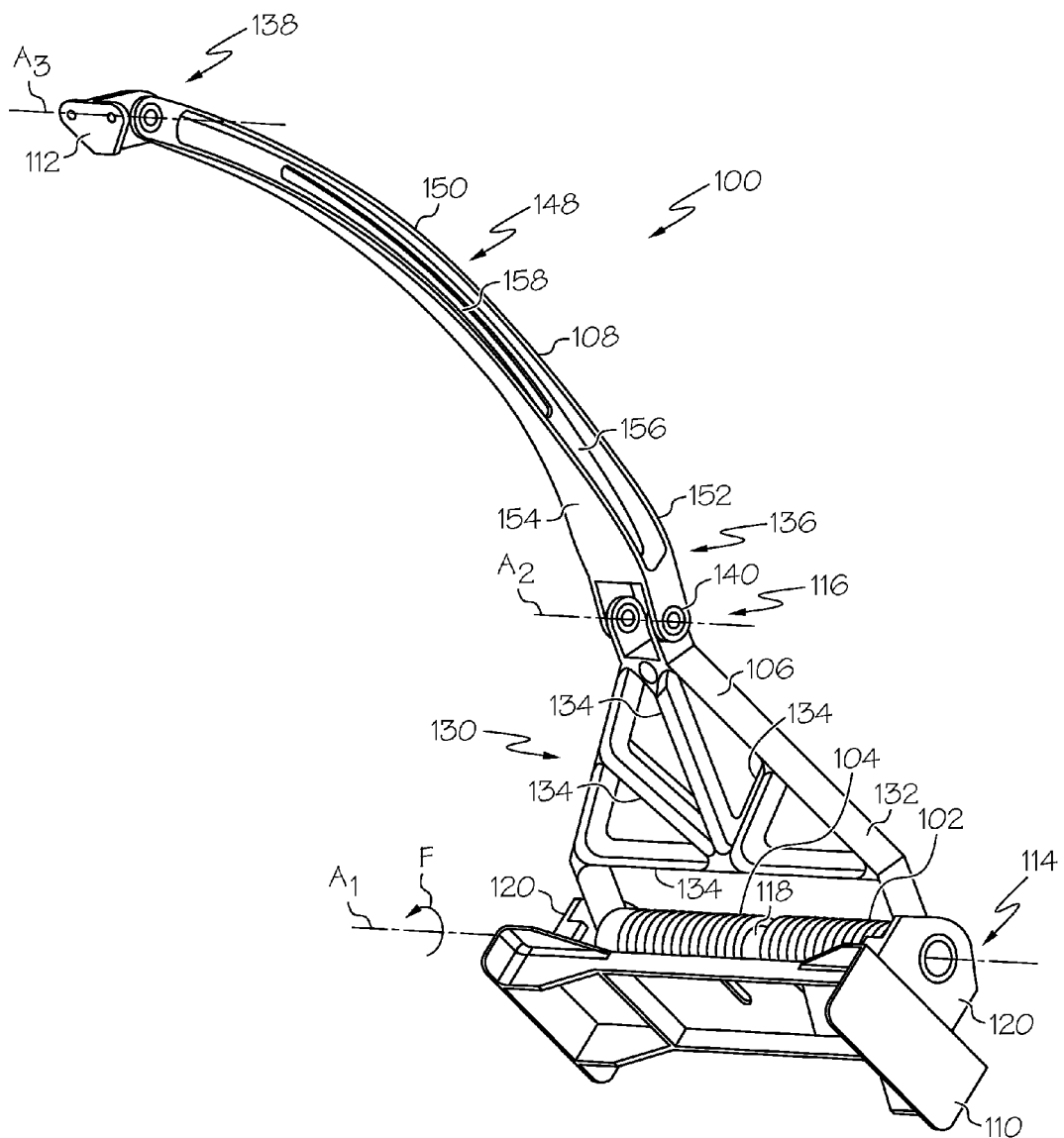
FIG. 8 is another perspective view of the door member biasing assembly of FIG. 7.

Referring to FIGS. 7 and 8, one embodiment of the disclosed door member biasing assembly, generally designated 100, may include torsion springs 102, 104, a primary link member 106 and an extension link member 108. A support structure 110 may facilitate connecting the door member biasing assembly 100 proximate the opening 36 in the aircraft 10 (e.g., to the inside of the fuselage/wing fairing 20), as shown in FIGS. 3 and 4. A coupling bracket 112 may facilitate connecting the door member biasing assembly 100 to the door member 40 of the aircraft 10, as shown in FIGS. 3 and 4.

The primary link member 106 may include a proximal end 114 and a distal end 116. The proximal end 114 of the primary link member 106 may be hingedly connected to the support structure 110 about a first hinge axis $A_1$. For example, the proximal end 114 of the primary link member 106 may include a hinge rod 118 extending along the first hinge axis $A_1$ between two opposed mounting brackets 120. The mounting brackets 120 may be fixedly connected to the support structure 110, yet may allow the hinge rod 118 and, thus, the primary link member 106 to rotate about the first hinge axis $A_1$.

The torsion springs 102, 104 may be coaxially received over the hinge rod 118 of the primary link member 106 in an axially side-by-side configuration. A first end 122 (see FIG. 7) of each torsion spring 102, 104 may be engaged with the support structure 110. A second, opposite end 124 of each torsion spring 102, 104 may be connected to the hinge rod 118. For example, the second ends 124 of the torsion springs 102, 104 may be connected and may form a loop 126, which may be received over a boss 128 protruding from the hinge rod 118, thereby connecting the second ends 124 of the torsion springs 102, 104 to the hinge rod 118.

Thus, the torsion springs 102, 104 may apply a biasing force (arrow F) to the primary link member 106, thereby urging the primary link member 106 about the first hinge axis $A_1$ in the direction shown by arrow F.

The distal end 116 of the primary link member 106 may be hingedly connected to the extension link member 108 about a second hinge axis $A_2$. The body 130 of the primary link member 106 may include extension members 132 and reinforcement members 134, which may transfer the biasing force (arrow F) applied by the torsion springs 102, 104 to the distal end 116 of the primary link member 106 and, ultimately, to the extension link member 108.

The extension link member 108 may include a proximal end 136 and a distal end 138. The proximal end 136 of the extension link member 108 may be hingedly connected to the distal end 116 of the primary link member 106 about the second hinge axis $A_2$. For example, the proximal end 136 of the extension link member 108 and the distal end 116 of the primary link member 106 may be forked, and may be hingedly connected to each other with hinge pins 140.

The distal end 138 of the extension link member 108 may be hingedly connected to the coupling bracket 112 about a third hinge axis $A_3$. The coupling bracket 112 may be fixedly connected to the door member 40, such as with mechanical fasteners, welds or the like, as shown in FIGS. 3 and 4.

Thus, the biasing force (arrow F) supplied by the torsion springs 102, 104 may be applied to the primary link member 106, which may transfer the biasing force to the extension link member 108, which may apply the biasing force to the door member 40. Therefore, the biasing force (arrow F) supplied by the torsion springs 102, 104 may be of a sufficient magnitude to bias the door member 40 from the open position (FIG. 4) to the closed position (FIG. 3) and smoothly fair the door member 40 with the outer surface 41 of the aircraft 10. While the biasing force (arrow F) supplied by the torsion springs 102, 104 may be overcome by the door opening force (arrow O in FIG. 3) supplied to the door member 40 by the torque tube 34 (during actuation/extension of the flaps 28), the biasing force (arrow F) may be sufficient to return the door member 40 to the closed position (FIG. 3) once the torque tube 34 has been withdrawn from the opening 36.

The extension link member 108 of the disclosed door member biasing assembly 100 may be designed to collapse in response to a predetermined excessive force, such as in the event of a jam. By strategically designing the extension link member 108 to collapse, the risk of damage to surrounding components/systems (e.g., the torque tube 34) in the event of a failure (e.g., jam) may be reduced (if not eliminated).

Various techniques may be employed to facilitate a controlled collapse of the extension link member 108 in response to a predetermined excessive force. In one implementation, the extension link member 108 may be formed with a structural weakness at a desired location, such as at or near the center portion 148 of the extension link member 108.

In one particular construction, the extension link member 108 may have an elongated body 150 extending from proximate the proximal end 136 to proximate the distal end 138. The body 150 may include opposed first and second extension members 152, 154 interconnected by a tie member 156, thereby giving the body 150 of the extension link member 108 an I-shaped profile in cross-section. An opening 158 may be formed in the tie member 156, thereby giving the extension link member 108 a structural weakness sufficient to achieve a controlled collapse in the event of a predetermined excessive force. The location of the opening 158 in the tie member 156 may be a design consideration, and may be dictated by where the controlled collapse is desired. The size/elongation of the opening 158 in the tie member 156 may be a design consideration, and may be dictated by the composition of the extension link member 108 and the desired collapse/failure point.

Thus, if the disclosed door member biasing assembly 100 were to jam, the extension link member 108 may collapse during actuation/extension of the associated flap 28 and corresponding opening of the door member 40. Therefore, intentionally introducing a designed structural weakness may ensure that the door member biasing assembly 100 does not interfere with the operation of the flaps 28, and that failure of the door member biasing assembly 100 does not damage the flap carriage mechanism 32 and/or the torque tube 34 during actuation of the flaps 28.

Figure 9:
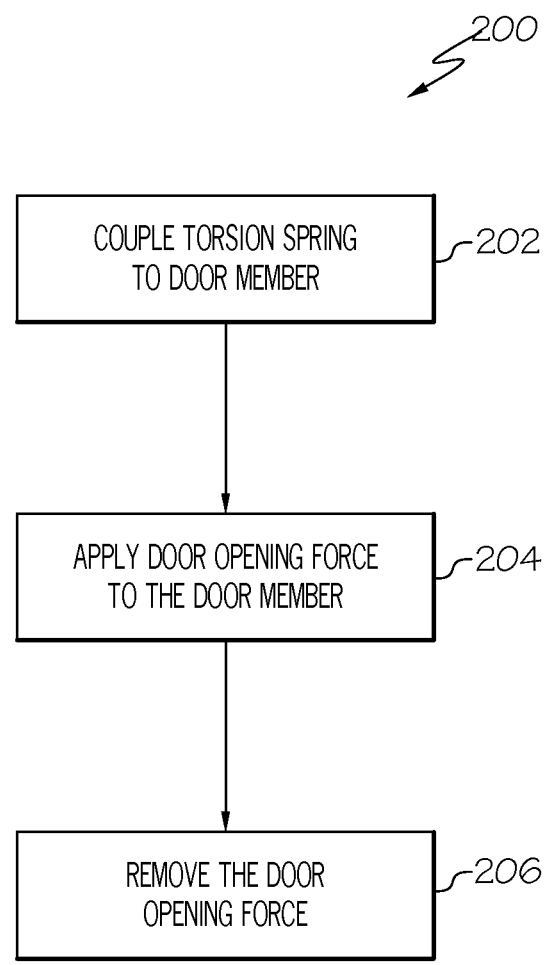
FIG. 9 is a flow diagram depicting one embodiment of the disclosed method for biasing a door member on an aircraft.

Also disclosed is a method for biasing a door member 40 on an aircraft 10. Referring to FIG. 9, one embodiment of the disclosed method, generally designated 200, may begin at Block 202 with the step of operatively connecting a torsion spring 102, 104 (FIG. 3) to the door member 40 (FIG. 3). The torsion spring 102, 104 may be associated with a biasing assembly 100 (FIG. 3) that may include a primary link member 106 (FIG. 3) and an extension link member 108 (FIG. 3), wherein the primary link member 106 and the extension link member 108 transfer a biasing force (arrow F in FIG. 7) from the torsion spring 102, 104 to the door member 40.

At Block 204, a door opening force (arrow O in FIG. 3) may be applied to the door member 40 (FIG. 3). The door opening force may overcome the biasing force (arrow F in FIG. 7) of the torsion spring 102, 104 (e.g., the door opening force may be greater than the biasing force supplied by the torsion spring). Therefore, the door opening force may move the door member 40 to an open position.

At Block 206, the door opening force (arrow O in FIG. 3) may be reduced or altogether removed from the door member 40 (FIG. 3). When the door opening force is reduced/removed, the biasing force (arrow F in FIG. 7) of the torsion spring 102, 104 may urge the door member 40 to the closed position.

Although various embodiments of the disclosed aircraft and associated door member biasing assembly and method have been shown and described, modifications may occur to those skilled in the art upon reading the specification. The present application includes such modifications and is limited only by the scope of the claims.

What is claimed is:

1. An aircraft having an opening therein, said aircraft comprising:
   a door member connected to translate relative to said opening between at least an open position and a closed position; and
   a biasing assembly operatively connected to said door member to bias said door member to said closed position, said biasing assembly comprising:
      a primary link member hingedly connected to said aircraft proximate said opening, said primary link member being moveable about a first hinge axis;

an extension link member having a proximal end and a distal end, said proximal end of said extension link member being hingedly connected to said primary link member about a second hinge axis, said distal end of said extension link member being hingedly connected to said door member about a third hinge axis; and a torsion spring operatively connected to said primary link member.

2. The aircraft of claim 1 further comprising:
a fuselage;
a wing connected to said fuselage; and
a fuselage/wing fairing extending from proximate said fuselage to proximate said wing.

3. The aircraft of claim 2 wherein said fuselage/wing fairing defines said opening.

4. The aircraft of claim 3 further comprising a flap connected to said wing, wherein said flap is actuated by a torque tube that is moveable through said opening.

5. The aircraft of claim 1 further comprising a first track member opposed from a second track member, each of said first and said second track members defining a slot therein, wherein said door member is moveably engaged with said slots in said first and said second track members.

6. The aircraft of claim 5 wherein said opening is between said first track member and said second track member.

7. The aircraft of claim 5 wherein said door member comprises at least a first roller and a second roller, and wherein said first roller is engaged with said slot in said first track member and said second roller is engaged with said slot in said second track member.

8. The aircraft of claim 1 wherein said biasing assembly comprises a primary link member and an extension link member hingedly connected to said primary link member, and wherein said torsion spring is operatively connected to said primary link member.

9. The aircraft of claim 1 wherein said torsion spring urges said primary link member about said first hinge axis.

10. The aircraft of claim 1 wherein said biasing assembly further comprises a support structure, and wherein said primary link member is hingedly connected to said support structure by mounting brackets.

11. The aircraft of claim 1 wherein said primary link member comprises a hinge rod extending along said first hinge axis, and wherein said torsion spring is coaxially received over said hinge rod.

12. The aircraft of claim 11 wherein said torsion spring comprises a first end and a second end, wherein said first end is engaged with said aircraft, and wherein said second end is connected to said hinge rod.

13. The aircraft of claim 1 wherein said extension link member comprises an elongated body, said elongated body comprising:
a first extension member;

a second extension member opposed from said first extension member; and
a tie member connecting said first extension member and said second extension member.

14. The aircraft of claim 13 wherein said tie member defines an opening therein.

15. An aircraft comprising:
a fuselage;
a wing connected to said fuselage;
a fuselage/wing fairing positioned at an interface between said fuselage and said wing, said fuselage/wing fairing defining an opening therein;
a door member positioned to translate relative to said opening between at least an open position and a closed position; and
a biasing assembly comprising:
a primary link member hingedly connected proximate said opening and moveable about a first hinge axis;
an extension link member having a proximal end and a distal end, said proximal end being hingedly connected to said primary link member about a second hinge axis, said distal end being hingedly connected to said door member about a third hinge axis; and
a torsion spring operatively connected to said primary link member to urge said primary link member about said first hinge axis.

16. A method for biasing a door member on an aircraft, said door member being connected to translate relative to an opening between at least a closed position and an open position, said method comprising:
operatively connecting a biasing assembly to said door member to urge said door member to said closed position, said biasing assembly comprising:
a primary link member hingedly connected to said aircraft proximate said opening, said primary link member being moveable about a first hinge axis;
an extension link member having a proximal end and a distal end, said proximal end of said extension link member being hingedly connected to said primary link member about a second hinge axis, said distal end of said extension link member being hingedly connected to said door member about a third hinge axis; and
a torsion spring operatively connected to said primary link member;
applying a door opening force to said door member to move said door member to said open position, thereby loading said torsion spring; and
removing said door opening force, thereby allowing said biasing assembly to urge said door member to said closed position.

17. The method of claim 16 wherein said applying step comprises moving a torque tube through said opening into engagement with said door member.

* * * * *